INVENTORS
JOHN E. CARUTHERS
ROBERT E. DEAL
BY
ATTORNEY

INVENTORS
JOHN E. CARUTHERS
ROBERT E. DEAL
BY
ATTORNEY

INVENTORS
JOHN E. CARUTHERS
ROBERT E. DEAL
BY
ATTORNEY

United States Patent Office 3,488,563
Patented Jan. 6, 1970

3,488,563
UNDERGROUND ELECTRIC POWER DISTRIBUTION SYSTEM
John E. Caruthers, Pine Bluff, Ark., and Robert E. Deal, Kirkwood, Mo.; said Caruthers assignor to Central Transformer Corporation, Pine Bluff, Ark., a corporation of Arkansas, and said Deal assignor to Kearney-National Inc., St. Louis, Mo., a corporation of Delaware
Filed Mar. 28, 1966, Ser. No. 537,863
Int. Cl. H01h 47/00
U.S. Cl. 317—157.6       6 Claims

ABSTRACT OF THE DISCLOSURE

Underground electric power distribution system having an apparatus center vault containing a transformer and a high voltage circuit interrupter arranged in the vault so that either is removable without disturbing the other, and so that the circuit interrupter is in the part of the air circulation path where outside air enters the vault. The system also involves one or more underground low voltage distribution centers. In each of the centers, the low voltage terminals are equipped with clusters of individually insulated conductors having a furled length sufficient that when unfurled, one end of each will extend above ground level.

---

This invention relates generally to the distribution of electric power, and particularly to a system of distribution in which both the high voltage and low voltage power lines, as well as the necessary local apparatus components, are below ground level.

Underground power distribution systems, as heretofore proposed, have gone into less extensive use than the proponents had envisioned. Among the objections which have been raised by practical people, in connection with such underground power distribution systems, are the inconvenience and the hazard involved in making new connections or changing old ones, the repair and replacement of apparatus components, and impractically prolonged "down time" necessary to make normally expected changes in the system without bringing at least part of the lines above ground, as by the provision of numerous so-called pedestals at which connections are made between individual service lines and the mains.

The general object of the invention is to provide an underground electric power distribution system in which all local apparatus is below ground level, but normal occasional changes in the system can be made without requiring a lineman to leave ground level.

Another object of the invention is to provide an underground electric power distribution system including transformers and circuit-protective apparatus, so arranged below ground level that any local apparatus component may be de-energized and removed without requiring the removal of another component, and without interrupting the power supply to other comparable apparatus at other locations in the system.

These and other objectives, which will become apparent as the description proceeds, are achieved by the present invention which, generally described, involves the provision, below ground level, of a series of apparatus centers with or without associated, but remotely situated, connection centers. The invention contemplates an apparatus center in which each transformer is located in its own vault below ground level, but openable at or about ground level to provide a passageway of magnitude such that the transformer may be readily moved into and out of the vault; and in which there is a separately enclosed circuit-protective device so disposed (either within the same vault or adjacent to it below ground level, but nevertheless accessible from ground level) that the heat generated by the transformer does not adversely affect operation of the circuit-protective device, and neither interferes with access to, or removal of, the other without requiring a workman to go below ground level. The invention further contemplates that the respective secondary terminals of the transformer each be equipped with a cluster of individually insulated flexible conductors permanently electrically connected together at their ends nearest the transformer, but free for substantial movement relative to each other at their opposite ends, said flexible conductors being of length sufficient to enable connections to be made thereon from ground level.

A further feature of the invention is the provision of watertight plug-in type connectors between the primary of the transformer and the circuit-protective device, as well as between the circuit-protective device and the high voltage main or mains supplying the power to the primary of the transformer. Such plug-in connectors not noly enable the quick and easy disconnection of one apparatus component from another, but enable such disconnection to be made without interruption of power to other transformers which may be energized from the same high voltage main.

The aforesaid connection centers consists of a chamber (which may be a single "joint" of sewer pipe, with its axis vertical) below ground level, and containing a plurality of "spiders" of individually insulated flexible conductors, one for each lead extending to the connection center from secondary terminals on the transformer in the apparatus center. Each "spider" in the connection center is electrically connected (underground) with a different secondary terminal on the transformer in the associated apparatus center. Such "spiders" consist essentially of a plurality of individually insulated flexible conductors all permanently electrically connected at one end which is encapsuated in insulation material. The individual flexible conductors of such spiders are of length sufficient that service connections can be made thereto from ground level.

While the invention is applicable to all distribution systems insulated for 600 volts, a single phase three-wire system, such as the familiar 240/120-volt system, will serve to illustrate it, and such is shown in the accompanying drawings, in which.

Figure 4:
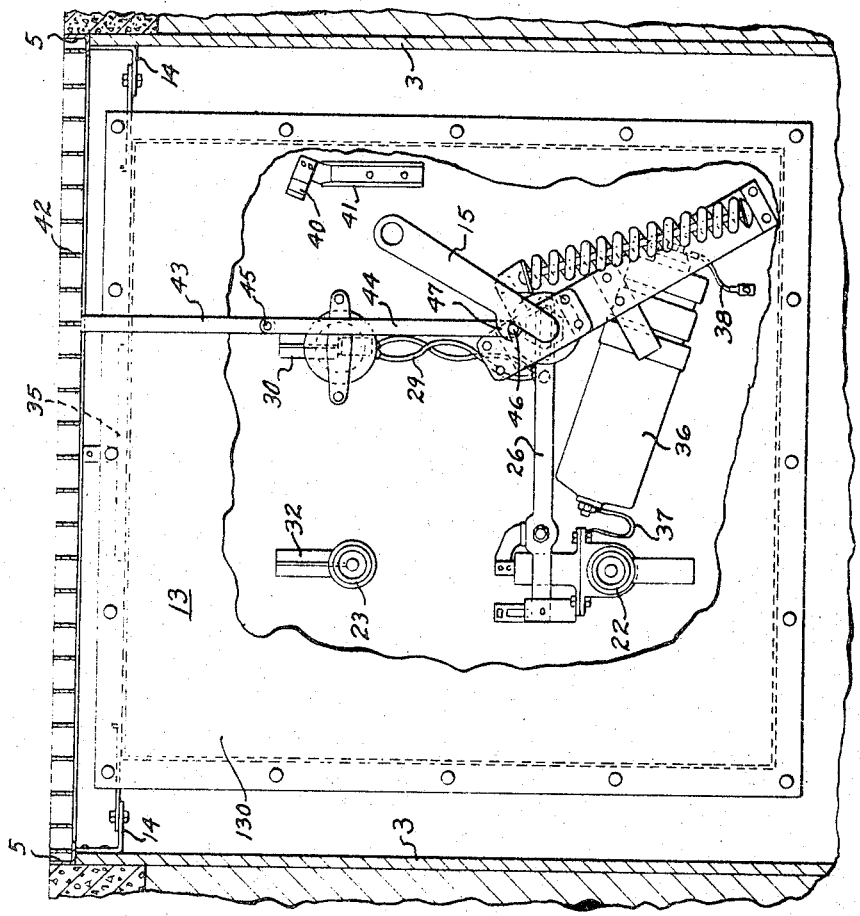
FIGURE 4 is a front elevation with part broken away to reveal the internal components of an enclosed circuit-protective and circuit-interrupting component of the apparatus center, as well as parts associated with such enclosure.
Figure 5:
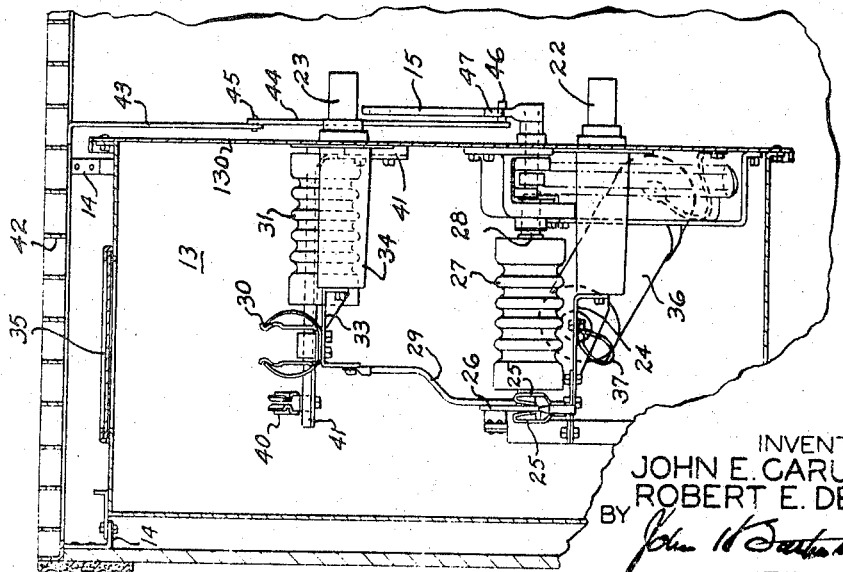
FIGURE 5 is a sectional view through the enclosure shown in FIGURE 4, and showing, in side elevation, the relationship of the various components and associated parts.
Figure 6:
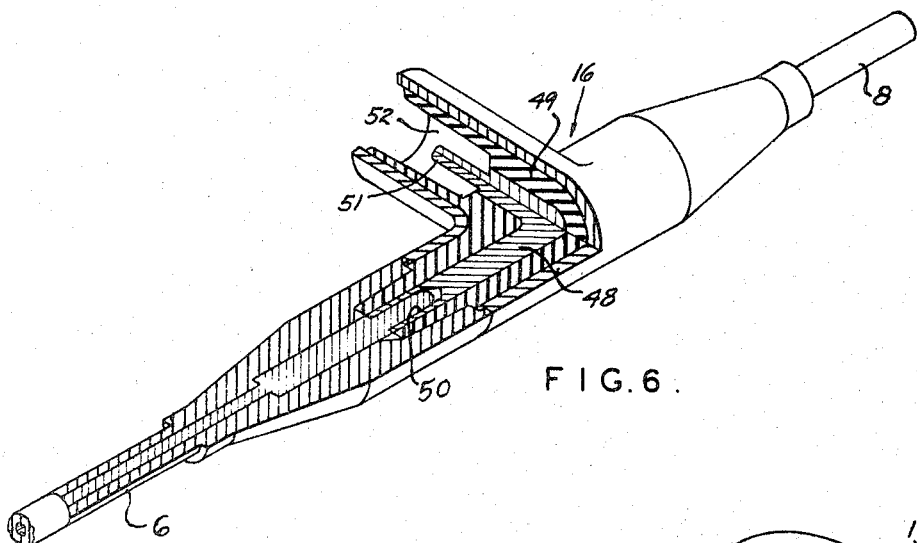
Figure 7:
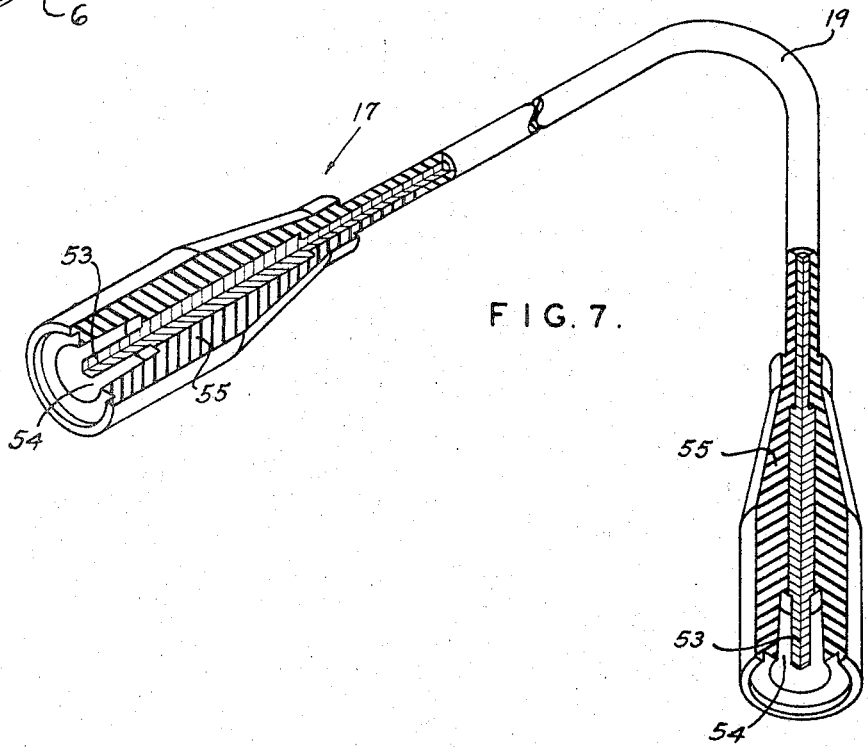

FIGURE 6 is a perspective view, part being broken away to reveal the interior construction of one suitable form of plug-in connection employed in accordance with the present invention for connecting the high voltage power main to the electrically-live components of the enclosure shown in FIGURES 4 and 5; and FIGURE 7 is a perspective view of a plug-in type jumper suitable for connecting the electrically-like components, shown in FIGURES 4 and 5, to the primary of a transformer.

Figure 1:
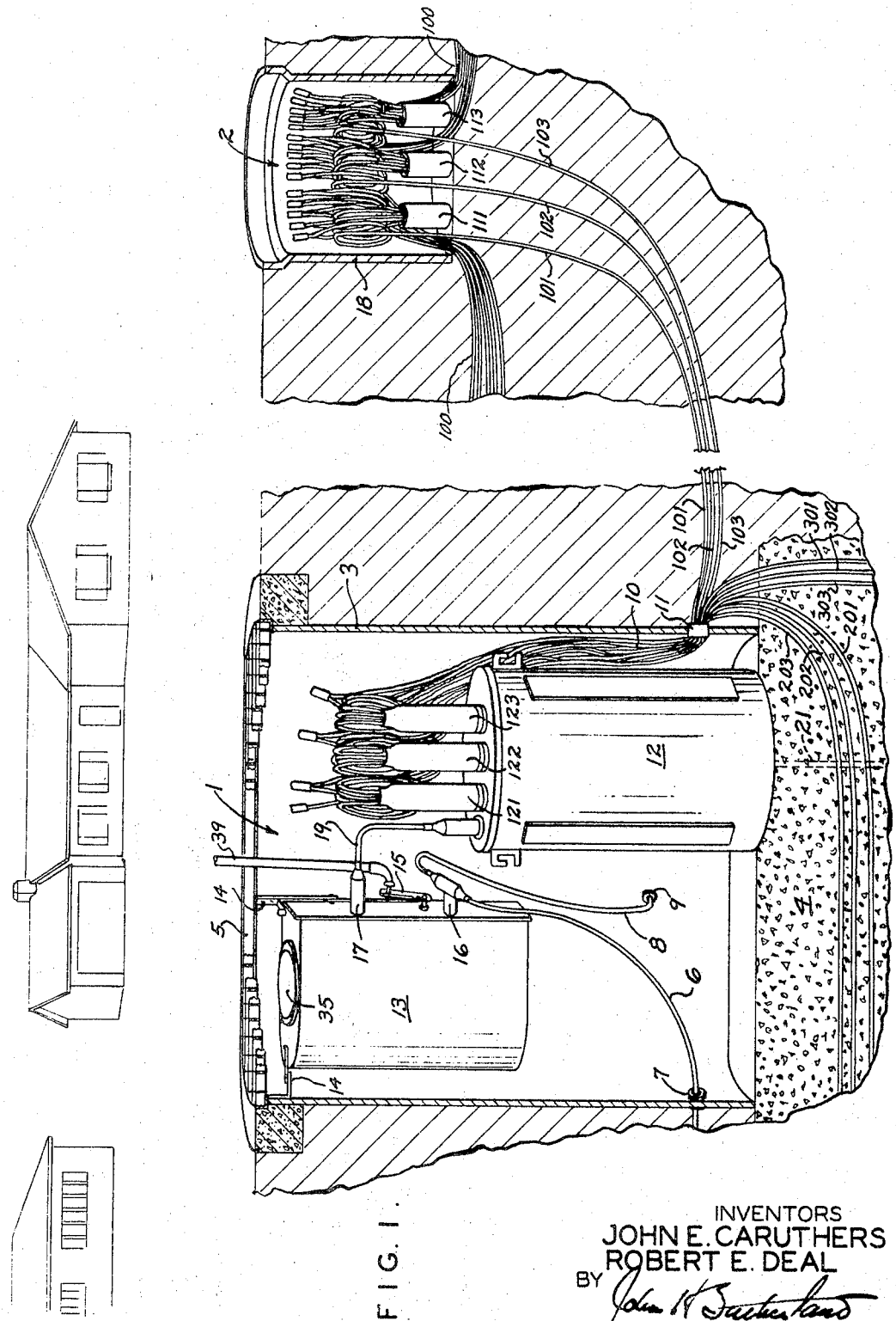
FIGURE 1 is a perspective view, partially in section, illustrating the composition and relationship of an apparatus center and a connection center organized, connected, and related to its environs in accordance with the present invention.

As shown in FIGURE 1, a typical installation of a distribution system organized in accordance with the present invention comprises at least one apparatus center 1, with or without one or more connection centers 2, which latter are located a substantial distance away from the apparatus center 1, but served thereby.

Figure 3:
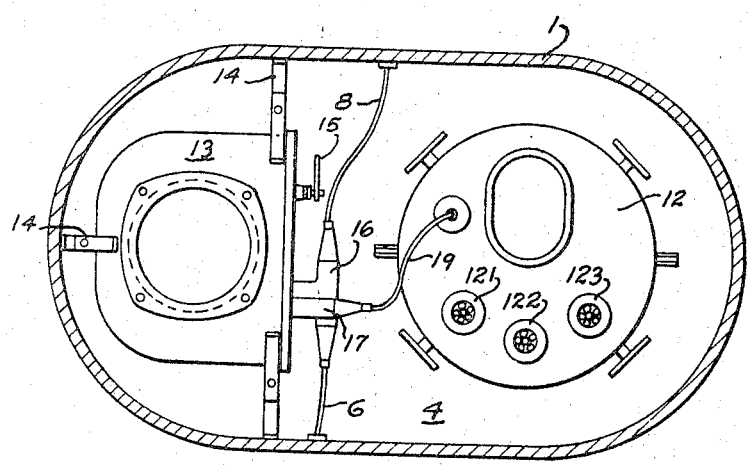
FIGURE 3 is a plan view of the apparatus center shown in FIGURE 1.

In the form shown in FIGURE 1, the apparatus center involves a vault 3, which may be, and preferably is, performed of any suitable water-impervious, soil-resistant material. In the form shown, and as illustrated more specifically in FIGURE 3, the vault 3 is preferably of oval or oblong cross-section, and is buried in the ground so that its top is substantially at ground level. The installation of the vault 3 involves digging a hole in the ground of depth somewhat in excess of the height of vault 3, then placing in the bottom of the hole a bed of gravel 4 which may have a depth of six to twenty-four inches, depending upon the soil drainage in the chosen locality. The bed of gravel 4 is so arranged and composed as to assure drainage from the interior of vault 3 so as to avoid the accumulation in the bottom of the vault of any substantial body of water which may enter the vault either by rainfall or by surface flow. The depth of the excavation for vault 3 will therefore depend upon the depth of the gravel bed 4 necessary to provide adequate drainage, and yet result in the location of the top of the gravel bed at a distance below ground level which is substantially equal to the height of vault 3. When the vault 3 has been lowered into the excavation so that the bottom edge thereof rests upon gravel bed 4, and the several high voltage and low voltage conductors, later to be described, have been positioned below ground level so as to extend either through the walls of vault 3 or beneath the lower end thereof, the earth is filled in around the vault to the normal ground level. Thereupon, a vault closure frame 5 is applied to the top of vault 3 and anchored either in the surrounding earth, or in a surrounding curbing of concrete, asphalt or the like.

In the form shown, a high voltage conductor 6, of suitably insulated underground cable, or the like, extends from a suitable source of power and enters vault 3 through a bushing 7 disposed in a hole through the wall of vault 3 near the lower end thereof. The conductor 6 may terminate in the vault, or, as is more often the case in practical installations, may proceed therebeyond to one or more other apparatus centers. In the latter event, as shown in FIGURE 1, the cable 6 has an electrical connection made to it within the vault and, beyond such connection, cable 8 proceeds through a bushing 9 underground to another apparatus center some distance away.

Similarly, any desired number of low voltage conductors 10 (of which nine are shown) leave vault 3 either by passing under the lower end thereof, or through the wall thereof via bushing 11 as shown, and extend underground either as individual building service lines, or to remotely located connection centers such as 2.

On the gravel bed 4, at the bottom of vault 3, a transformer 12 is placed adjacent one of the shorter sides of the vault. At the opposite shorter side of the vault, a watertight enclosure 13 is provided. As shown in the drawing, the enclosure 13 is hung on the side of the vault by brackets 14, but it may be put directly on the gravel bed 4 or attached to a self-supporting stand. The enclosure 13 contains a manually operable circuit-interrupting switch, as well as other circuit-protective devices as may be desired, such as a fuse, a lightning arrestor, or both. In order to minimize the effect of heat (generated in transformer 12) upon the circuit-protective devices in enclosure 13, the latter is preferably mounted in horizontally and vertically offset relationship with the transformer 12, and in up-stream relation to the transformer 12 in the pattern of air circulation induced by the heat of the transformer within the vault. Hence, in the form shown, the enclosure 13 is mounted in diagonally opposite relation to the location of transformer 12 within vault 3, and completely out of the path of the upwardly flowing stream of air which has been warmed by transformer 12.

The enclosure 13 is provided on its exterior with a lever 15 for operating a circuit-interrupting switch within the enclosure 13, and the lever 15 is so disposed that it may be operated with a conventional hot stick in the hands of a lineman at ground level, i.e., so as not to require the lineman to get into, or to reach his hand into, the vault in order to open or close the circuit-interrupting switch.

Provision is also made on the exterior of enclosure 13 for the reception of plug-in electrical connectors 16 and 17. Plug-in connector 16 may be of the form illustrated in FIGURE 6, and serves to connect the high voltage mains 6 and 8 to one terminal of the circuit-interrupter within enclosure 13. Plug-in connector 17 serves to connect the opposite terminal of the circuit-interrupter, with or without intervening protective devices, to the primary of transformer 12. Thus, the arrangement is such that when the circuit-interrupter switch within enclosure 13 has been operated to its open circuit position, plug-in connector 16 may be disengaged to electrically deaden the contents of enclosure 13, without interrupting the continuous flow of energy between high voltage conductor 6 and high voltage conductor 8, or another apparatus center served by the latter.

The primary of transformer 12 is energized through a jumper 19 of the construction illustrated in FIGURE 7, and the opposite end of the primary may be grounded through a ground rod 21 driven through the gravel bed 4.

In the embodiment shown, the transformer 12 has three secondary terminals 121, 122 and 123, projecting upwardly through the top of the transformer. Such terminals are preferably of the character disclosed in the concurrently filed application of William W. Olive, Jr., and Charles J. Carlson, Jr., Ser. No. 538,081, now Patent No. 3,344,382, and such includes a cluster of individually insulated flexible conductors permanently electrically and mechanically connected together at their ends adjacent transformer 12, and having a length sufficient that, when unfurled, the opposite end thereof is accessible from ground level, so that connections with low voltage underground conductors 10 can be made with selected ones of the several clustered conductors by conventional pole line tools, supplies and techniques, without requiring the lineman to work below ground level. For instance, such connections can be made by the customary H-frame compression connectors, and covered with a water-impervious barrier of insulation. For example, low voltage conductors 101, 201 and 301 are respectively connected to different member-conductors of the cluster associated with terminal 121; low voltage conductors 102, 202 and 302 are respectively connected to different member-conductors of the cluster associated with terminal 122; low voltage conductors 103, 203 and 303 are respectively connected to different member-conductors of the cluster associated with terminal 123.

As shown in FIGURE 1, three of the secondary conductors 10, which are labeled respectively 101, 102, and 103, extend underground from the vault 3 to connection center 2 some distance away. In the form shown in the drawing, connection center 2 consists of a joint of sewer pipe 18 buried on end in the ground with the bell thereof adjacent ground level. Secondary conductors 101, 102 and 103 terminate in connection center 2, where they are respectively connected each to a different one of three spiders 111, 112 and 113.

The individual spiders 111, 112 and 113 may be constructed in accordance with the application of Charles M.

Broom and Robert H. Stevens, Ser. No. 511,648, filed Dec. 6, 1965, and in the illustrated embodiment, each such spider includes five short lengths of insulated flexible conductor, one of which has a current-carrying capacity equal to the sum of the other four. Each of the five short lengths of insulated flexible conductor has one of its ends stripped of insulation, and the five stripped conductor ends are electrically connected together and encapsulated in insulation material set in situ thereabout, so as to embed at least part of the insulation on each short length of conductor. The low voltage conductors 101, 102 and 103 are respectively connected to the free end of the one of the five conductors in the spider which has the greater current-carrying capacity, while the free ends of the other four conductors in a given spider are connected, within the connection center 2, each to a different one of individual building service lines 100 (of which ten are shown).

The individual conductors in the respective spiders 111, 112 and 113 are each of length sufficient to be accessible at ground level when the insulation encapsulated end thereof is at the bottom of connection center 2. Likewise, the free end of each of the individual service lines 100 is of such length within the connection center that it, too, may be unfurled so as to be accessible at ground level. Thus, when an individual building service is to be connected to, or disconnected from, the system, the several conductors of the individual building service may be connected respectively with appropriate conductors from two or three of the spiders 111, 112 and 113, depending upon the type of service desired, and such connections may be made in the same manner, with the same tools, supplies and techniques as are customarily employed in making such connections on pole lines, as, for example, by the use of the customary H-frame compression connectors and the application of a moisture-proof barrier or boot of insulation material thereabout.

Figure 2:
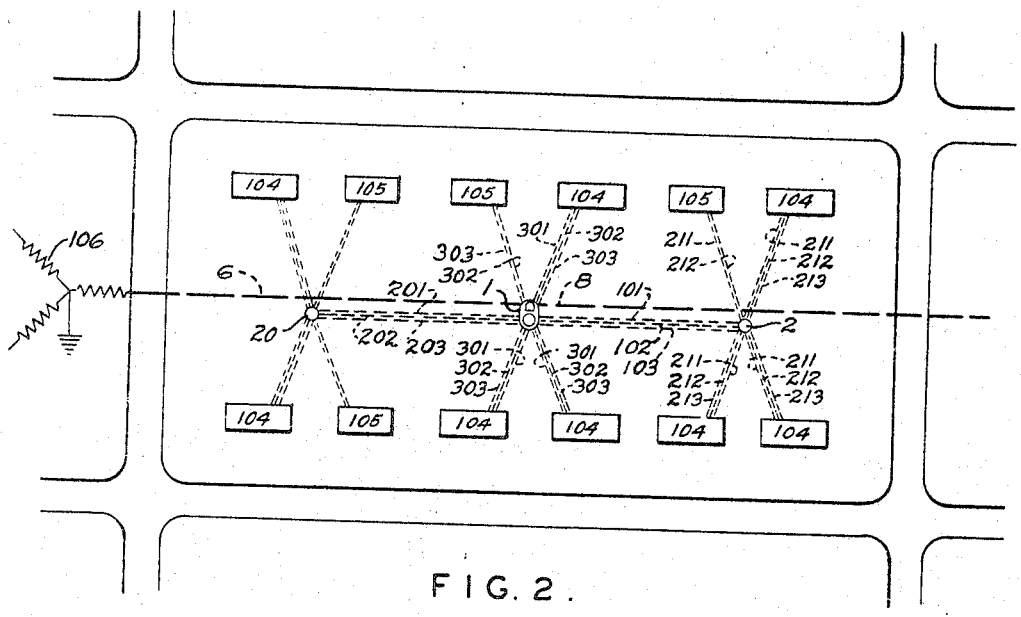
FIGURE 2 is a diagrammatic representation of a typical residential block served by the underground electric power distribution system of the present invention.

A typical application of the distribution system of this invention to a residential city block is illustrated in FIGURE 2. While the illustration typifies a single-phase, three-wire (e.g., 240/120-volt) or two-wire (e.g., 120-volt) service to each individual building, it will be understood that the invention is equally applicable to three-phase and other types of residential, commercial, and industrial power distribution. In the form shown in FIGURE 2, there are twelve houses in the block, some of which, 104, are supplied with 240/120-volt service, while others, 105, are supplied with only 120-volt service. The electric power is supplied to the block from a source 106 through a single underground main 6, to apparatus center 1, and the underground main is tapped within apparatus center 1 to connect it, as through a plug-in fitting 16, to the circuit-protective devices within enclosure 13, but extends therebeyond, as high voltage main 8, to supply a similar apparatus center in the next block. From the apparatus center 1, there extend from the secondary of transformer 12: underground low voltage conductors 101, 102 and 103 to connection center 2; underground low voltage conductors 201, 202 and 203 to a connection center 20; and three sets (only one set being shown in FIGURE 1) of three underground low voltage conductors 301, 302 and 303, one set for each of three buildings 104 which are supplied with 240/120-volt service, as well as another set of two underground low voltage conductors 302 and 303 for a building 105 which is supplied with only 120 volt service. Similarly, from connection centers 2 and 20, there radiate the service lines 100 for four individual buildings, some of which, 104, are provided with 240/120-volt service, and another of which, 105, is provided with only 120-volt service. As shown in FIGURE 2, among the buildings served from connection center 2 are: three buildings 104, provided with three-wire service 211, 212 and 213; and a building 105, provided with two-wire service by conductors 211 and 212. Each of the individual building service lines 211 is connected, in connection center 2, to a different smaller conductor leg of spider 111; each of the individual building service lines 212 is connected to a different smaller conductor leg of spider 112; and each of the individual building service lines 213 is connected to a different smaller conductor leg of spider 113. The arrangement in and from connection center 20 is comparable to that in and from connection center 2.

The organization of the high voltage circuit-interrupting and protective devices within the watertight enclosure 13 is illustrated in FIGURES 4 and 5. In the preferred form, the components of enclosure 13 are all mounted upon front plate 130 of the enclosure with the electrically-live ones on the interior of the enclosure and surrounded by air. A plug-on terminal 22 for cooperation with the plug-in terminal 16, and a plug-on terminal 23 for cooperation with the plug-in terminal 17, are both mounted so as to be accessible from the exterior of plate 130, but have a conductive part extending therethrough with appropriate insulation. Terminal 22 is electrically connected through a bracket 24, with the stationary contacts 25 of a manually operable circuit-interrupter having a blade 26 mounted upon one end of insulator 27, the other end of which has a stub shaft 28 which constitutes the axis of rotation for blade 26. Blade 26 is connected through a pigtail 29 to a fuse receptacle 30 mounted upon an insulator 31, so as to be in substantially spaced relationship with front plate 130. A companion fuse receptacle 32 is electrically connected through bracket 33, and a conductive part (not shown) extending through an insulator 34, to plug-on connector 23. The fuse receptacles 30 and 32 are disposed to receive opposite ends of an appropriate cartridge fuse (not shown), and to position it directly below window 35 in the top of enclosure 13. The window 35 is made watertight, and held in position by suitable means, such as bolts, which are quickly releasable from the exterior so as to permit access, from ground level, for replacement of the fuse when necessary.

A lightning arrestor 36 is connected with conductive bracket 24 through a pigtail 37, and the opposite end of the lightning arrestor is grounded through pigtail 38 to plate 130.

For moving the switch blade 26 between circuit-closing and circuit-opening positions, lever 15 is provided on the exterior of plate 130 for rotation about an axis aligned with stub shaft 28. On the inside of plate 130, a spring and toggle linkage, of a type well known in the art, is provided for transmitting motion from lever 15 to an actuator which rotates insulator 27 and its associated switch blade 26, with a snap action, between closed and open position when lever 15 is rotated sufficiently in the clockwise direction (as seen in FIGURE 4) to move the toggle linkage over-center, and vice versa to move the switch blade from open to closed position. In order to arrest the snap-action movement of the switch blade when being moved from closed circuit to open circuit position, and to retain the blade in open position until forcibly moved by reverse rotation of lever 15, a suitable blade arrestor-gripper 40 is mounted upon a bracket 41, so as to position it in the orbit of movement of blade 26 remote from stationary contacts 25.

If desired, switch operating lever 15 may be interlocked with closure 42 of vault 3 so that the closure 42 may not be opened while switch blade 26 is in its closed-circuit position. Such interlocking may, for example, be accomplished by providing a strut 43, projecting downwardly from closure 42, and having a link 44 freely hinged thereto by pin 45. The lower end of link 44 hangs in the space between lever 15 and plate 130, and is provided at its lower end with a protuberance 46 substantially vertically aligned with the axis of rotation of lever 15. Lever 15 is provided with an ear 47 which, in the closed-circuit position of lever 15, overhangs protuberance 46, as clearly shown in FIGURE 4. Accordingly, when the lever 15 is in the position shown in FIGURE 4, any effort to lift closure 42 is obstructed by ear 47 being in the path of upward movement of protuberance 46.

When, as is usually the case, closure 42 is in the form of a grill, it may be provided with an opening which will accommodate the insertion of a hot-line stick for engagement with lever 15, so as to move the latter between closed-circuit and open-circuit positions, or vice versa, while closure 42 remains in place. Upon such movement to open-circuit position, ear 47 is moved out of the position where it interferes with upward movement of protuberance 46, and the closure 42 may thus readily be lifted while the switch is in open-circuit position. Alternatively, with obvious rearrangement of parts, the closure 42 may be so interlocked with lever 15 that the latter is moved to open-circuit position by any effort to lift or remove closure 42.

The plug-in and plug-on connectors 16, 17, 22 and 23 may be of any appropriate, preferably watertight, construction, one suitable form of each of which is illustrated in FIGURES 6 and 7. In the embodiment shown in FIGURE 6, the plug-in connector 16 is of the T type, and consists of a T-shaped conductive element 48 embedded in insulating material 49. The conductive element 48 has, at opposite ends of the bar thereof, female parts 50, and, at the end of the stem portion, a male part 51. About male part 51, the insulating material 49 is formed to provide an open socket 52 for reception of the male-formed insulation portion of plug-on connector 22 which projects on the outside of plate 130 of enclosure 13, but which, within the male-formed insulation portion, is provided with a female conductive part comparable to parts 50 of connector 16. For cooperation with the female conductive parts 50 of connector 16, the ends of high voltage mains 6 and 8 may be provided with a male conductive part and a female insulation part, comparable respectively to 51 and 52 of connector 16. Alternatively, the mains 6 and 8 may be permanently connected with conductive parts 50 of connector 16.

The plug-in connector 17, which cooperates with plug-on connector 23 to connect the electrically emergized parts within enclosure 13 with the primary of transformer 12 through jumper 19, is constructed as shown in FIGURE 7, where a male-like conductive part 53 projects outwardly within a female-like socket 54 in the body of insulation 55, so that the cooperation between plug-in connector 17 and plug-on connector 23 is precisely the same as the cooperation previously described in connection with the related connectors 16 and 22. The opposite end of jumper 19 may be permanently connected to the primary of transformer 12, but if desired (and as shown), the opposite end of jumper 19 may be provided with a plug-in connector identical with 17, and in such event, the primary winding of the transformer will terminate on the exterior of the transformer tank with a plug-on connector identical with 23 of enclosure 13.

From the foregoing description, those skilled in the art will recognize that the invention accomplishes its objects, and provides a wholly underground electrical power distribution system in which the respective elements of apparatus, and the various connections between conductors, can be operated upon to the extent of making normally predictable changes without requiring linemen, or other maintenance personnel, to leave ground level. In fact, the transformer can be removed from the vault without disturbing the enclosure for the protective devices, and vice versa, without requiring the human attendant to leave ground level. Similarly, when it is desired to change connections either at the apparatus center or at the connection center, the joint (either a previously made joint or a new one to be made) is accessible for the necessary operations without requiring the workman to leave ground level. The latter is accomplished by providing, within the apparatus center, sufficient loose length in the individual connectors of the transformer terminal clusters, together with their associated, or to-be-associated, low voltage conductors 10 that, when unfurled, the joint location will be at, near, or above ground level. Likewise, in the connection center, the legs of the respective spiders, together with their associated line conductors 100, 101, 102 and 103, have a sufficient loose length, within the connection center, that the joints between the spiders and the conductors will, when the loose length of spider legs and conductor legs are unfurled, be readily accessible at ground level.

Thus, the invention provides an underground distribution system which is not only economical to install and efficient in operation, but which facilitates the making of changes in connections, interchanges of apparatus and, withal, minimizes the hazards involved not only in the operation of the system, but to the personnel who are required, from time to time, to attend it.

While one specific embodiment of the invention has been disclosed in detail for the purpose of illustrating its construction, operation and advantages, it is to be distinctly understood that the invention is not limited to the details of the above-described specific embodiment. On the contrary, it is realized that those skilled in the art may, depending upon the application involved, modify, revise, and adapt the features of the embodiment shown in the drawings in accordance with their skill in the art, without departing from the spirit of the invention or the scope of the appended claims.

Having thus described the invention, what is claimed and desired to be secured by Letters Patent is:

1. The combination in an underground electric power distribution system of a vault having a top opening adjacent ground level, a transformer in said vault, a connection center below ground level and remote from said vault, a plurality of conductors extending underground from the secondary of said transformer to said connection center, said connection center having a plurality of spiders of individually insulated flexible conductor legs all permanently electrically connected at one end thereof respectively, said end of all flexible conductor legs in a given spider being permanently embedded in dielectric material located adjacent the bottom of said connection center, each of the spiders being electrically connected to a different one of said first-mentioned conductors, and at least some of the flexible conductor legs in each spider being of length sufficient to be accessible at ground level.

2. The combination of claim 1 wherein the secondary terminals of said transformer are each provided with a cluster of individually insulated flexible conductor legs permanently electrically connected at one end, each of said clusters being electrically connected to one of said plurality of conductors extending underground from the secondary of said transformer to said connection center.

3. The combination in an underground electric power distribution system of: a transformer situated in a vault below ground level, said vault having a ventilated closure adjacent ground level, an open passageway extending from said transformer to said closure, said transformer having a plurality of secondary terminals, each of said terminals having a cluster of individually insulated flexible conductor legs permanently electrically connected together at one end, said clusters being located in said passageway, each of said flexible conductor legs being of loose length sufficient to be accessible from ground level, a manually operable circuit interrupter in said vault below ground level, but substantially spaced from said transfomer, a watertight enclosure for said circuit interrupter, said interrupter having opposite poles electrically connected respectively to terminals accessible on the exterior of said enclosure, insulated conductor having dielectric means for electrically connecting one of said terminals to a main power conductor in watertight relation, an insulated conductor extending from the other of said terminals to the primary of said transformer, said last-mentioned insulated conductor being connected to said transformer and said other terminal through a watertight plug-on type connector, at least one connection center below ground level and remote from said vault, at least two distribution conductors extending respectively between said connection center and an individually insulated flexible conductor leg in different ones of said clusters, a plurality of distribution spiders in said connection center, said distribution spiders each consisting of a plurality of individually insulated flexible conductor legs permanently electrically connected in watertight relation to a different one of said distribution conductors, and service conductors connected in watertight relationship to at least some of the flexible conductor legs of each distribution spider, and the flexible conductor legs of said distribution spiders having an unfurlable length sufficient to be accessible from ground level.

4. The combination in an underground electric power distribution system of a transformer situated wholly below ground level, an open passageway extending from said transformer to ground level, said transformer having a plurality of secondary terminals, each of said terminals having a cluster of individually insulated flexible conductor legs permanently electrically connected together at one end, said clusters being located in said passageway, each of said flexible conductor legs being of loose length sufficient to be accessible from ground level; at least one connection center below ground level and remote from said transformer, at least two distribution conductors extending respectively between said connection center and an individually insulated flexible conductor leg in different ones of said clusters, a plurality of distribution spiders in said connection center, said distribution spiders each consisting of a plurality of individually insulated flexible conductor legs permanently electrically connected together at one end, and each of said distribution spiders being electrically connected in watertight relation to a different one of said distribution conductors, and service conductors connection in watertight relationship to at least some of the flexible conductor legs of each distribution spider, and the flexible conductor legs of said distribution spiders having an unfurable length sufficient to be accessible from ground level.

5. The combination in an underground electric power distribution system of a vault having a ventilated top adjacent ground level, a transformer at the bottom of said vault, a manually operable high voltage circuit interrupter having a watertight enclosure, said enclosure being mechanically free of said transformer and disposed within said vault at a position which is substantially spaced horizontally from said transformer, an underground supply conductor connected with said circuit interrupter, an insulated conductor connecting said circuit interrupter with said transformer; and a watertight plug-on connector member accessible from the exterior of said enclosure electrically connected interiorly of said enclosure with said circuit interrupter, a high voltage main extending into said valut and having thereon a plug-in connector which mates with said plug-on connector, said plug-in connector having:

(1) a socket of insulating material open at its free end; and
(2) a conductive element exposed within but terminating short of the open end of said socket.

6. The combination of claim 5 wherein said plug-on connector has a male-formed insulation portion and a female-formed conductive element embedded in said male-formed insulation portion, said conductive element (2) of said plug-in connector being male-formed for reception into the female-formed conductive element of said plug-on connector when said male-formed insulation portion of said plug-on connector is received in watertight mating relationship with the socket of said plug-in connector.

References Cited

UNITED STATES PATENTS

| | | | |
|---|---|---|---|
| 1,891,959 | 12/1932 | Sprong | 174—37 X |
| 2,024,742 | 12/1935 | Parsons | 174—37 X |
| 2,100,721 | 11/1937 | Parsons | 174—37 X |
| 2,785,319 | 3/1957 | Simpson et al. | 307—147 |
| 3,344,382 | 9/1967 | Olive et al. | 336—107 |

LEE T. HIX, Primary Examiner

U.S. Cl. X.R.

317—157.61; 307—11, 17, 42, 43, 83, 147, 149; 339—29; 174—37